2,871,207

PROCESS OF POLYMERIZING A MIXTURE OF FURFURAL, A SECONDARY AROMATIC AMINE AND A LIGNIN COMPOUND AND PRODUCT OBTAINED THEREBY

Orland R. Sweeney and Lionel K. Arnold, Ames, Iowa, and Justin T. Long, Auburn, Ala., assignors to Iowa State College Research Foundation, Inc., Ames, Iowa, a corporation of Iowa No Drawing. Application December 24, 1953
Serial No. 400,394

11 Claims. (Cl. 260—17.5)

Our invention relates to a furfural plastic and to a process for producing the same. More particularly, our invention relates to a furfural plastic produced by the direct polymerization of furfural in the presence of an acidic condensing agent and a secondary aromatic amine.

This application is a continuation-in-part of our copending application Serial No. 207,662, filed January 24, 1951, and now Patent 2,671,061.

At the outset, we would like it to be understood that in this specification the terms "resin" and "plastic" are used to denote organic chemical reaction products which are formed by polymerization or polycondensation reactions. The term "casting syrup" refers to the mixture or solution of furfural with certain additives to assist the polymerization, and the term "condensing agent" refers to any agent which brings about a condensation, or polymerization, or hardening of the casting syrup by any means whatsoever.

It has been known for a considerable period of time that furfural could be polymerized or set into a hardened plastic by the use of acidic condensing agents such as hydrochloric or sulfuric acid. However, the product of such condensation was found to be a dull black solid possessing little mechanical strength and completely unsuited for the manufacture of useful articles. Therefore, an effort has been made to modify the polymerizing tendencies of furfural in the presence of an acidic condensing agent to produce a plastic having commercially useful properties.

One method of approach to the problem suggested above has been to form derivatives of furfural such as furfuryl alcohol which have improved polymerization characteristics over furfural itself. This approach has met with some success in the production of furan plastics, etc. Another approach, however, which has heretofore been unsuccessful is to modify the polymerization characteristics of furfural by using small quantities of additive or catalyzing agents.

Therefore, it is an object of our invention to develop a plastic formed by the polymerization of furfural in the presence of additive agents which modify the polymerizing characteristics of furfural so as to produce a plastic with commercially useful properties. It is another object of our invention to develop a process for the production of a new furfural plastic composition wherein a casting syrup can be condensed by an acidic condensing agent to form the plastic at around room temperature and under normal atmospheric pressure. It is a still further object of our invention to develop a furfural casting syrup which does not undergo undue shrinkage in setting, and which produces a plastic having excellent physical strength and appearance.

Further objects and advantages will appear as the specification proceeds.

We have discovered that the above objects can be substantially accomplished by utilizing lignin or ligninsulfonic acid as an additive to modify the polymerizing characteristics of furfural in the presence of an acidic condensing agent. We have also discovered that the plastic produced by the polymerization of furfural can be still further improved in properties by using a plurality of additives, at least one of which is a form of lignin or ligninsulfonic acid, and another of which is a secondary aromatic amine, or a furan substituted with a group whose relative electronegativity is less than that of the aldehyde group, or a compound capable of condensing with furfural by an aldol-type reaction. We have found further that for many purposes one of these additives can be advantageously used.

In general, the furfural plastics of our invention are prepared by mixing small quantities of additives with a relatively large amount of furfural until the additives are dissolved. The resulting solution or casting syrup is then mixed with an acidic condensing agent which causes the furfural to polymerize until the casting syrup has hardened to produce the desired plastic. It will be apparent that the casting syrup can be poured into molds for the manufacture of various articles and allowed to harden therein. We have found that the plastic materials produced by our process may be used for various opaque articles such as buttons, ornaments, golf tees, toys, games and novelties. In addition, we have found that our plastic may be combined before condensation with suitable fillers, abrasives, or other materials for the formation of grinding wheels, chemically resistant tanks, pumps, piping, etc.

We have found that lignin or ligninsulfonic acid, preferably in an isolated form, when used as an additive to furfural effects a remarkable improvement in the properties of the plastic produced. While both lignin and ligninsulfonic acid appear to produce the desired alteration in polymerizing characteristics, we prefer to use ligninsulfonic acid because when using ligninsulfonic acid as an additive a lesser amount of the acidic condensing agent will be required; and therefore the residual acidity of the plastic will be lessened. This problem will subsequently be more fully discussed.

We have found that the proportions of lignin or ligninsulfonic acid to furfural can be considerably varied while obtaining a plastic with improved properties. However, we have found that it is preferable to use between about 10 to 33 parts per 100 parts by weight of furfural. More generally, a lesser portion by weight based on the furfural should be used. While we have found that lignin or ligninsulfonic acid is effective when used as a single additive, we prefer to use any of several other additives which will subsequently be discussed in conjunction with the lignin or ligninsulfonic acid. We have discovered that by using such a combination of additives it is possible to obtain results which cannot be obtained by either additive alone.

For example, we have found that the addition of small amounts of furan or substituted furan whose substituent group has a relative electronegativity less than that of the aldehyde group together with the addition of larger amounts of lignin or ligninsulfonic acid produces an unexpected improvement in the product. Among the compounds which can be used for this purpose are: 2-methylfuran, 2,5-dimethylfuran, 2-ethylfuran, 2-alkylfuran, furfuralacetone, furfuralacetophenone, furylacrolein, furfuryl acetate, furfurin, furfuryl alcohol, furfuralurea, furfuralthiourea, and furfuralphenylthiourea.

In general, we prefer to use between about 1 to 10 parts by weight of these additives per 100 parts by weight of furfural. While larger amounts of these additives can be utilized, we have found that the small amounts are adequate to modify the polymerizing characteristics of furfural, and that we do not need to use enough of the additives so that they themselves undergo polymerization such as might be expected with furfuryl alcohol, etc.

Although all of the compounds which were tested belonging to the class of a furan substituted with a group whose relative electronegativity is less than that of an aldehyde group were found to advantageously improve the properties of the product, we have discovered that 2-methylfuran is especially desirable because of the outstanding strength properties of the product produced. We have found that when as little as 2.5% by weight of 2-methylfuran is added to the furfural casting syrup, the flexural strength of the product is increased to three times the original value.

We have further discovered that certain of the furan substituted additives can be formed in situ by the reduction of part of the furfural to the desired compound. For example, 2-methylfuran can be formed in situ by reduction of part of the furfural to the methyl compound. In many cases such a method of producing the casting syrup is desirable in place of the addition of the additive to the furfural. Thus, by the reduction of furfural under suitable conditions, there results a mixture which without further separation or purification may be condensed by means of a suitable condensing agent to give a product which is substantially identical with that obtained by the addition of the additive, such as pure 2-methylfuran. We have also found that furfurin can also be formed in situ in the furfural by reacting with ammonia and heating to 120° C. and that this mixture can advantageously be used as a casting syrup. It will be readily seen by those skilled in the art that certain of the other furan substituted additives can be produced by chemically modifying a portion of the furfural.

While we prefer to use the furan substituted additives of the class indicated in conjunction with lignin or ligninsulfonic acid, we have found that in certain cases the furan substituted additives can advantageously be used alone. For example, when 2-methylfuran is used as a single additive the product has a greatly increased flexural strength, although its properties are not as good as when lignin or ligninsulfonic acid is also used as an additive.

Instead of the furan substituted additives just described, we have discovered that a secondary amine, and preferably a secondary aromatic amine, can be used as an additive in conjunction with lignin or ligninsulfonic acid to produce a plastic having remarkably improved properties, and properties which are superior to those when lignin or ligninsulfonic acid is used alone. Among the secondary aromatic amines which are advantageous for this purpose are: diphenylamine, di-beta-naphthyl-p-phenylenediamine, phenyl-beta-naphthylamine, and phenylthiourea. Other secondary amines can also be used such as di-n-butylamine.

In general, we have found that about 1 to 10 parts by weight of the secondary aromatic amine to 100 parts by weight of furfural is preferable. However, larger amounts of the secondary aromatic amines are not especially detrimental, but rather are unnecessary as not producing any further improvement in the product. Usually, a lesser portion by weight of the secondary amine should be employed, on the basis of the furfural. We have found that diphenylamine produces a plastic product from furfural which has the best all around properties. Also, as indicated, we prefer to utilize a secondary aromatic amine as an additive in conjunction with lignin or ligninsulfonic acid. We have found that for some purposes the secondary aromatic amine additives can advantageously be used alone.

We have also discovered that compounds capable of forming an aldol-type condensation derivative with furfural can advantageously be used as additives either alone or in conjunction with lignin or ligninsulfonic acid. Among the compounds of this class which we have found to be advantageous as additives are: urea, acetone, acetaldehyde, thiourea, and phenylthiourea. We have found that some improvement is obtained when these compounds are added to the furfural and either separately or together with lignin or ligninsulfonic acid, and then the resulting casting syrup is immediately condensed by an acidic condensing agent. However, we prefer to add the compound capable of forming an aldol-type condensation derivative with the furfural, and then refluxing the mixture in the presence of alkaline catalyst to effect a preliminary condensation, resulting in a solution of the aldol-type condensation product in excess furfural. We have found that this resulting solution may be condensed or polymerized without further purification in the presence of an acidic condensing agent, and that the product is improved by adding lignin or ligninsulfonic acid just prior to the condensation but subsequent to the refluxing step.

We have found that a relatively small amount of these additives is required to achieve the desired results, and we prefer to use between about 1.5 to 3 parts by weight of these compounds forming an aldol-type condensation derivative to 100 parts by weight of furfural. In general, any basic catalyst such as pyridine which is effective for aldol-type condensations can be used in the refluxing step. We have found that best results are obtained when the refluxing is carried out over a period of several hours at relatively low temperatures.

In the preceding discussion we have referred to the use of an acidic condensing agent to effect the condensation of the various casting syrups prepared by incorporating additives with furfural. As pointed out above, it has been known for a considerable period of time that furfural could be condensed or polymerized in the presence of various acidic condensing agents such as hydrochloric or sulfuric acid, or other acidic compounds such as ferric chloride. While acidic condensing agents of this type have been found to be generally operative in producing the desired polymerization of the furfural in our process, we have found that the use of strong acids such as hydrochloric and sulfuric acid causes the plastic product to have an undesirable residual acidity. We have discovered that this residual acidity in the plastic is undesirable and will cause corrosion of steel and similar materials upon sustained contact therewith. Moreover, we have found that this undesirable acidity is not a temporary characteristic of the plastic but persists over long periods of time. At first, our efforts to remove or neutralize this acidity met with little success. After lengthy experiments, however, we discovered that the product can be greatly improved by the use of an organic sulfonic acid as a condensing agent. By the use of such a condensing agent instead of a stronger mineral acid the residual acidity of the resulting plastic is practically eliminated. Among the aromatic sulfonic acids which we have found desirable in achieving this result are: p-toluenesulfonic acid, o-toluenesulfonic acid, toluenesulfonic acid (the crude mixture of isomers), benzenesulfonic acid, naphthalenesulfonic acid, ligninsulfonic acid, 2-amino-8-naphthol-6-sulfonic acid (Gamma acid), and o-aminophenol-p-sulfonic acid. It seems possible that the explanation as to why the aromatic sulfonic acids do not produce a residual acidity while effecting the desired polymerization is to be found at least in part in the affinity of furan nucleus for the aromatic grouping of the sulfonic acid.

We have found that the temperature required for carrying out the polymerization at a given rate varies as the reactivity of the condensing agent. Also, we have found that this reactivity is related to the aromatic group with which the sulfonic group is combined. Therefore, we prefer to use p-toluenesulfonic acid as a condensing agent since the polymerization can be effected at room temperature or slightly below. However, the other aromatic sulfonic acids are operable and produce the desired result when the temperature of the casting syrup is slightly elevated. For example, temperatures of around the boiling point of water are satisfactory for acids such as: o-aminophenol-p-sulfonic acid or 2-amino-8-naphthal-6-sulfonic acid. We have also found that it is not necessary to use purified p-toluenesulfonic acid, but that the product resulting from the sulfonation of toluene is directly usable without purification.

In order to more fully disclose our invention, we wish to set out the following illustrative examples:

Example I

Six pounds of diphenylamine and 15 pounds of ligninsulfonic acid were mixed with 100 pounds of furfural until dissolved. The resulting solution or casting syrup was then mixed with 55 pounds of p-toluenesulfonic acid and poured into molds to harden. The hardening was accomplished at room temperature and under atmospheric pressure, and the product produced had excellent properties for use as an opaque plastic.

Example II

The process was carried out as in Example I except that diphenyl-p-phenylaminediamine was substituted for diphenylamine.

Example III 2.5 pounds of 2-methylfuran and 15 pounds of ligninsulfonic acid were mixed with 100 pounds of furfural until dissolved. The resulting casting syrup was then mixed with 40 pounds of p-toluenesulfonic acid and poured into molds to harden. The hardening was carried out at room temperature and under atmospheric pressure to produce a plastic of unusual flexural strength and excellent general properties.

Example IV

The process was carried out as set forth in Example III except that the 2-methylfuran was formed in situ, by reduction of part of the furfural to the methyl compound before the addition of the ligninsulfonic acid.

Example V

Five pounds of furfurin and 25 pounds of lignin were added to 100 pounds of furfural and mixed until dissolved. The resulting casting solution was then mixed with 50 pounds of o-aminophenol-p-sulfonic acid and poured into heated molds to harden. A temperature of around 100° C. was maintained until the condensation was completed. The product produced was found to have desirable properties as an opaque plastic.

Example VI

Four pounds of 2-methylfuran were mixed with 100 pounds of furfural until dissolved. The resulting solution was then mixed with 55 pounds of p-toluenesulfonic acid and poured into molds to harden at room temperature. The resulting product was found to have excellent strength properties and good general appearance.

Example VII

Twenty-five pounds of ligninsulfonic acid were mixed with 100 pounds of furfural until dissolved. The solution was then mixed with 60 pounds of p-toluenesulfonic acid and poured into molds to harden at room temperature. The resulting product had good general appearance and showed desirable properties for an opaque plastic.

Example VIII

Three pounds of urea and ¼ pound of pyridine were mixed with 100 pounds of furfural and refluxed for 12 hours. The resulting solution was then cooled to room temperature and mixed with 50 pounds of p-toluenesulfonic acid and poured into molds to harden. The resulting product was found to be a commercially useful plastic.

Example IX

The process was carried out as in Example VIII except that 15 pounds of lignin was added to the cooled solution just prior to the addition of the condensing agent.

Example X

Three pounds of 2-methylfuran were mixed with 100 pounds of furfural until dissolved. The resulting casting syrup was then mixed with 25 pounds of concentrated hydrochloric acid and poured into molds to harden. The hardening was carried out at room temperature and under atmospheric pressure to produce a plastic having desirable strength properties.

Example XI

Six pounds of phenylthiourea and ⅓ pound of pyridine were mixed with 100 pounds of furfural and refluxed for 10 hours. The resulting solution was then cooled to room temperature and mixed with 25 pounds of concentrated hydrochloric acid and poured into molds to harden. The resulting product was found to be a commercially useful plastic.

Example XII

Six pounds of di-n-butylamine were mixed with 100 pounds of furfural until dissolved. The resulting solution or casting syrup was then mixed with 25 pounds of concentrated hydrochloric acid and poured into molds to harden. The hardening was accomplished at room temperature and under atmospheric pressure and the product produced had good properties for use as an opaque plastic.

While in the foregoing specification for purpose of illustrating specific embodiments of our invention we have set forth many details as to specific compositions and operating conditions, it will be apparent to those skilled in the art that many of these details can be varied without departing from the spirit of our invention.

We claim:

1. The process of polymerizing furfural to form a plastic material, which comprises forming a casting syrup from furfural, a secondary aromatic amine, and a compound selected from the group consisting of lignin and ligninsulfonic acid a lesser proportion by weight of said secondary aromatic amine being employed than the proportion of said furfural, and then condensing the casting syrup by adding thereto an acidic condensing agent.

2. The process of polymerizing furfural to form a plastic material, which comprises forming a casting syrup from furfural, a secondary aromatic amine, and a compound selected from the group consisting of lignin and ligninsulfonic acid a lesser proportion by weight of said secondary aromatic amine being employed than the proportion of said furfural, and then condensing the casting syrup by adding thereto an aromatic sulfonic acid.

3. The product produced by the process of claim 2.

4. The process of polymerizing furfural to form a plastic material, which comprises condensing furfural with a toluene sulfonic acid in the presence of an additive compound selected from the group consisting of lignin and ligninsulfonic acid and diphenylamine, a lesser proportion by weight of said diphenylamine being employed than the proportion of said furfural.

5. The product produced by the process of claim 4.

6. The process of polymerizing furfural to form a plastic material, which comprises forming a casting syrup from furfural, a lesser portion by weight of a secondary aromatic amine, and a lesser portion by weight of a compound selected from the group consisting of lignin and ligninsulfonic acid, and then condensing the casting syrup by adding thereto an acidic condensing agent.

7. The process of claim 6 in which said condensing agent is toluene sulfonic acid.

8. The product produced by the process of claim 7.

9. The process of polymerizing furfural to form a plastic material, which comprises mixing 100 parts by weight of furfural with 1 to 10 parts by weight of a secondary aromatic amine and with from 10 to 33 parts by weight of a compound selected from the group consisting of lignin and ligninsulfonic acid to produce a casting syrup, and then condensing the said casting syrup by adding thereto an acidic condensing agent.

10. The process of claim 9 in which said acidic condensing agent is an aromatic sulfonic acid.

11. The product produced by the process of claim 10.

References Cited in the file of this patent

UNITED STATES PATENTS

| 2,671,061 | Sweeney et al. | Mar. 2, 1954 |
| 2,709,696 | Wiest | May 31, 1955 |